United States Patent [19]

Sams

[11] 4,298,932
[45] Nov. 3, 1981

[54] SERIAL STORAGE SUBSYSTEM FOR A DATA PROCESSOR

[75] Inventor: Jack G. Sams, Boynton Beach, Fla.

[73] Assignee: International Business Machines Corporation, Armonk, N.Y.

[21] Appl. No.: 47,005

[22] Filed: Jun. 11, 1979

[51] Int. Cl.³ .......................... G06F 9/34; G06F 15/16
[52] U.S. Cl. .................................................. 364/200
[58] Field of Search ........................ 364/200 MS File

[56] References Cited

U.S. PATENT DOCUMENTS

| | | | |
|---|---|---|---|
| 3,725,876 | 4/1973 | Hauck | 364/200 |
| 3,761,881 | 9/1973 | Anderson et al. | 364/200 |
| 3,810,117 | 5/1974 | Healey | 364/200 |
| 3,878,513 | 4/1975 | Werner | 364/200 |
| 3,889,243 | 6/1975 | Drimak | 364/200 |
| 3,909,798 | 9/1975 | Wallach et al. | 364/200 |
| 3,918,031 | 11/1975 | Watson | 364/200 |
| 3,967,247 | 6/1976 | Andersen et al. | 364/200 |
| 3,986,171 | 10/1976 | Spoelder | 364/200 |
| 4,047,243 | 9/1977 | Dijkstra | 364/200 |
| 4,056,848 | 11/1977 | Gilley | 364/200 |

OTHER PUBLICATIONS

Fletcher, R. P., "System Utilizing Low Cost Control Store Backing Memory", IBM Tech. Discl. Bull., vol. 20, No. 10, Mar. 1978, pp. 4226-4229.
Thurber, Kenneth J., Carge Scale Computer Architecture, 1976, pp. 102-106.
Jensen, Douglas E., "Mixed-Modeand Multidimensional Memories", Digest of Papers 1972:Innovative Architecture, Sixth Ann. IEEE Comp. Soc. International Conf., Sep. 1972.
Foster, Caxton C., Computer Architecture, 1976, pp. 93-95.

Primary Examiner—James D. Thomas
Assistant Examiner—Thomas M. Heckler
Attorney, Agent, or Firm—Richards, Harris & Medlock

[57] ABSTRACT

A serial storage subsystem for a data processor is provided. The system includes a first processor and a first data storage device including a plurality of data storage locations for storing data. A second data storage device includes a plurality of data storage locations for storing data. A control device is provided and is associated with the first processor for selecting one of the plurality of data storage locations of the first data storage device as an access window for accessing the second data storage device, such that the first processor gains access to at least one of the plurality of data storage locations of the second data storage device by addressing a selected one of the plurality of data storage locations of the first data storage device. The system further includes a second processor responsive to the first processor for transferring data between the selected one of the plurality of data storage locations of the first data storage device and at least one of the plurality of data storage locations of the second data storage device.

22 Claims, 5 Drawing Figures

SERIAL STORAGE SUBSYSTEM FOR A DATA PROCESSOR

DESCRIPTION

1. Technical Field

This invention relates to computer systems and data storage subsystems, and more particularly to a multiple dimensioned address space storage system using block storage devices.

2. Background Art

A continuing problem facing computer designers and computer programmers is the need to minimize the cost of computer memory without increasing the access time required to locate desired data. Memory devices from which computer programs derive direct data are typically referred to as main or primary memories, and as such must be capable of providing data in various lengths or words. Secondary memory storage devices, such as magnetic drums, disks or tapes, typically store large quantities of data which is provided to the primary memory in blocks under control of programmer read and write instructions. Additionally, typically in the art, address information for a data element is treated as a data element itself. The largest representation of a data object has become the largest representation of an address. Therefore, computer architecture has expanded to store larger addresses and extended address information at greater expenses. The alternative to such expansion is smaller address space resulting in limited computer usage.

Prior art memories have been technologically limited to sequential or random access linear lists, which often require that their contents be continuously reorganized by programmed instructions. Typical memories are orgainized as sequentially or randomly accessed wordwise-linear, one-dimensional lists. Additionally, stacks and queues are examples of commonly used information structures which are not random access.

It has also been proposed to use multidimensional arrays for memory devices. Prior art memories include subscripted arrays which are linearized through complex address translation techniques. Dimensionality refers to the number of coordinates of a memory. In a random access, wordwise one-dimensional linear memory, an n-dimensional array is linearized. Extensive program manipulation is required for such linearization.

A need has thus arisen for a multidimensional memory which is invisible or internal to the computer architecture for the storage and transfer of blocks of information and which does not require programmer manipulation. Such a memory system would enable the amount of storage space in a data processor to be increased without increasing the main storage addressing requirements. A need has further arisen for the use of block storage devices in combination with direct memory access techniques for implementing state of the art technology in memory devices.

SUMMARY OF THE INVENTION

In accordance with the pesent invention, a serial storage subsystem for a data processor is provided. The system includes a first processor and a first data storage device including a plurality of data storage locations for storing data. A second data storage device includes a plurality of data storage locations for storing data. A control device is provided and is associated with the first processor for selecting one of the plurality of data storage locations of the first data storage device as an access window for accessing the second data storage device, such that the first processor gains access to at least one of the plurality of data storage locations of the second data storage device by addressing a selected one of the plurality of data storage locations of the first data storage device. The system further includes a second processor responsive to the first processor for transferring data between the selected one of the plurality of data storage locations of the first data storage device and at least one of the plurality of data storage locations of the second data storage device.

In accordance with another aspect of the present invention, a storage subsystem for a data processor is provided. The system includes a first processor and a random access data storage device associated with the first processor which includes a plurality of data storage locations for storing data. A serial block storage device is provided and includes a plurality of data storage locations of variable widths for storing data. A control device is coupled to the first processor for selecting one of the plurality of data storage locations from the random access data storage device as an access window for accessing at least one of the plurality of data storage locations of the serial block storage device. A second processor is provided and is responsive to the first processor for transferring data between the selected one of the plurality of data storage locations of the random access data storage device and at least one of the plurality of data storage locations of the serial block storage device. A buffer device is associated with the first processor and a buffer device is associated wih the serial block storage device. The buffers temporarily store data prior to data transfer between the storage devices to thereby increase the speed at which data is transferred between the storage devices.

BRIEF DESCRIPTION OF THE DRAWINGS

For a more detailed description of the present invention and for further objects and advantages thereof, reference is made to the following; Description, taken in conjunction with the following Drawings in which.

DESCRIPTION OF THE PREFERRED EMBODIMENT

Figure 1:
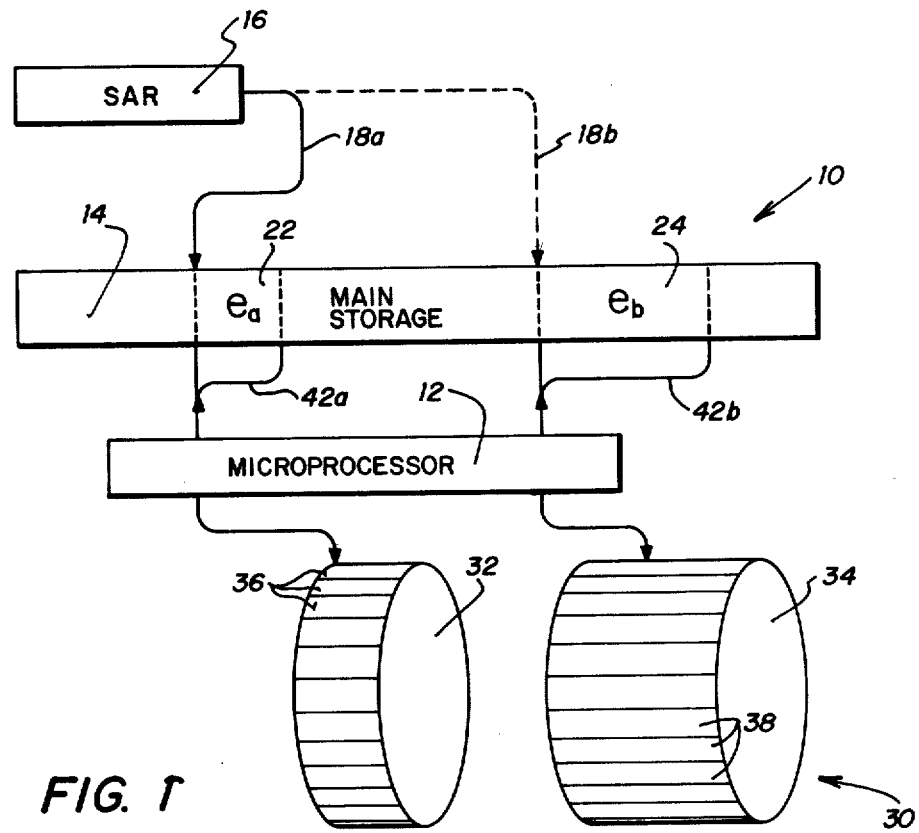
FIG. 1 is a schematic block diagram of the major components of a data processing system incorporating the storage subsystem of the present invention.

Referring to FIG. 1, the major components of a data processing system in which the present serial storage subsystem is utilized is illustrated. The system includes a data processor generally identified by the numeral 10 and a microprocessor 12. With certain minor exceptions, the general form of microprocessor 12 construction is shown and described in connection with FIG. 17 of U.S. Pat. No. 4,038,642 entitled "Input/Output Interface Logic for Concurrent Operations" granted to Bouknecht et al on July 26, 1977 and assigned to International Business Machines Corporation of Armonk, N.Y. which is incorporated herein by reference. Associated with microprocessor 12 is a main storage device 14 for storing program instructions and data. A program is executed by reading its instructions out of main storage device 14 in a sequential manner. Associated with main storage device 14 is a storage address register (SAR) 16 which stores the next instruction address for purposes of addressing the next instruction in main storage device 14 via signal lines 18a and 18b.

Main storage device 14 includes a plurality of storage locations for storing data and instructions. For example, data storage locations $e_a$ identified by the numeral 22 and data storage locations $e_b$ identified by numeral 24 are illustrated in FIG. 1. Data storage locations 22 and 24, as illustrated, are of variable widths for storing data of different length words.

The serial storage subsystem of the present invention is generally identified by the numeral 30 and comprises a plurality of auxiliary serial block storage devices, illustrated in FIG. 1, as including serial block storage devices 32 and 34. Serial block storage device 32 includes a plurality of data storage locations 36 having a width corresponding to the width of data storage location 22 of main storage device 14. Similarly, serial block storage device 34 includes a plurality of data storage locations 38 corresponding in width to the width of data storage location 24 of main storage device 14. Although two serial block storage devices 32 and 34 are illustrated as comprising the serial storage subsystem 30, it is understood that any number of variable width auxiliary storage devices can be appended to a corresponding number of data storage locations within main storage device 14.

Access to serial storage subsystem 30 is obtained by addressing a selected data storage location within main storage device 14 by storage address register 16 which locates the first or only word in the selected data storage location. Therefore, the selected data storage location within main storage device 14 serves as an "access window" to serial storage subsystem 30. For example, data storage location 22 of main storage device 14 serves as an access window to serial block storage device 32 and the plurality of data storage locations 36. Communication between main storage device 14, microprocessor 12 and serial storage subsystem 30 is via an access mechanism 42, shown in FIG. 1 as signal lines 42a and 42b. It therefore can be seen that additional auxiliary data storage locations within serial storage subsystem 30 can be appended to other data storage locations within main storage device 14 to further increase the storage capacity of data processor 10 without increasing the number of addressable main storage locations within main storage device 14. Therefore, an important aspect of the present invention is that a third dimension is, in effect, added to main storage device 14.

As used herein, a "data storage location" is comprised of, for example, at least eight bits. Wider data elements occupy an assigned number of contiguous storage locations. When a data element stored in a data storage location is transferred, the various bits thereof are transferred in a parallel simultaneous manner. As used herein, "data element" includes both address information as well as data information.

Serial block storage devices 32 and 34 of serial storage subsystem 30 may comprise numerous block storage devices in which data is serially stored. These devices may include, for example, a charge coupled storage device manufactured by Texas Instruments Incorporated, Model No. TMS 3064 JL which is a 65,536-bit CCD memory device described in "MOS Memory Data Book" published by Texas Instruments Incorporated and dated 1978. Such a charge coupled device is also described in U.S. Pat. No. 3,947,698 issued to Cheek, Jr. et al on Mar. 30, 1976 and entitled "Charge Coupled Device Multiplexer". Alternatively, serial block storage devices 32 and 34 may comprise magnetic bubble storage devices such as a Model No. TIBO203 magnetic bubble memory manufactured and sold by Texas Instruments Inc. Such magnetic bubble storage devices are described in U.S. Pat. No. 4,090,251 issued to Flannigan et al on May 16, 1978 and entitled "Bubble Memory Redundancy Storage". Additionally, electron beam addressable storage devices and optical beam storage devices may be utilized in the present invention.

Figure 2:
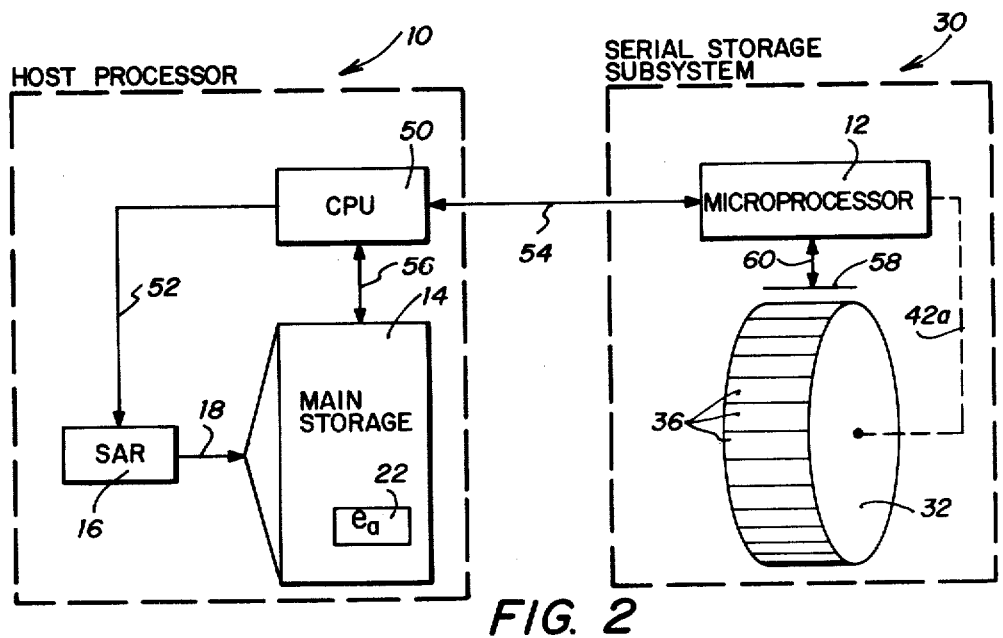
FIG. 2 is a more detailed schematic block diagram of a data processing system incorporating the present storage subsystem.

Referring to FIG. 2, an implementation of the present serial storage subsystem 30 is illustrated. Data processor 10 may comprise, for example, a host processor and includes a central processing unit (CPU) 50 interconnected to SAR 16 via signal line 52. Central processing unit 50 performs data processing and control functions in response to program instructions stored in main storage device 14. CPU 50 is interconnected via a data bus 54 to microprocessor 12 within serial storage subsystem 30. Microprocessor 12 manages serial block storage device 32.

Serial block storage device 32 includes a plurality of data storage locations 36 which can be reached in a one-after-the-other manner, serially, as opposed to a random manner. Serial block storage device 32 is operated as a storage stack of either the last-in-first-out (LIFO) type or the first-in-first-out (FIFO) type. The LIFO type is known as a "pushdown" stack wherein each new data element is added to the top of the stack with the existing elements in the stack being pushed or transferred down one data storage location. This operation is referred to as a "push" operation.

Conversely, when transferring data from serial block storage device 32, the data stored within the top data storage location is removed from the stack and the remaining elements wthin the stack are transferred up or are "popped" up a data storage location in the stack. This operation is known as a "pop" operation. For the FIFO type operation, each new element is added to the bottom of the stack and old elements move one position closer to the top of the stack when a data element is removed from the top of the stack. Serial block storage device 32 permits successive data elements to be located around a closed loop path which are accessed in serial order as they move past a fixed read/write device 58 (FIG. 2). Microprocessor 12 is interconnected via a bus 60 to a suitable read/write device 58 for inputting and receiving data from serial block storage device 32. Serial block storage device 32 is symbolically represented by a rotatable wheel throughout the Figures to indicate the serial order and closed loop path aspect of the serial block storage devices associated with serial storage subsystem 30 of the present invention. The serial storage subsystem of the present invention is therefore particularly well-suited for implementation of LIFO and FIFO stack structures.

Each data storage location 36 within serial block storage device 32 is capable of storing a single stack element which includes an index number field and a data element field. The index numbers are assigned in numerical order to the successive data storage locations 36 stored within serial block storage device 32. In operation of the present invention in a direct inquiry mode, microprocessor 12 can respond to an index number request to position serial block storage device 32 via serial storage access mechanism represented symbolically by signal line 42a so as to position the particular data storage location 36 having the corresponding index number in alignment with the read/write device 58. For LIFO and FIFO operations, microprocessor 12 is operable to move serial block storage device 32 one position forward or backward.

Data processor 10 includes "push" and "pop" instructions for adding and removing data elements from data stacks or data queues located in main storage device 14. A "push" instruction adds a new data element to a data storage location 36 of serial block storage device 32 and, in the LIFO operation, data processor 10 moves an existing stack element by one position within a data storage location 36 to make room for the new added data element.

Conversely, a "pop" instruction from data processor 10 removes a data element from serial block storage device 32 and moves the remaining stack elements to a position towards the top of the stack. For a read instruction from data processor 10, the top data element of serial block storage device 32 is simply read, but the remaining stack elements are not moved or changed in number. Similarly, for a write instruction from data processor 10, new data is written into the top data element of data storage location 36 of serial block storage device 32, but again the stack elements are not moved or changed in number. In other words, read and write instructions do not change the number of data elements within the plurality of data storage locations 36 and do not cause any change in the stack indexing mechanism.

The selected main storage device 14 (FIG. 2) data storage location, such as data storage location 22, serves as an access window to serial block storage device 32. The selected data storage location 22, in effect, represents the "top" data element stored in data storage locations 36 of serial block storage device 32 as far as the program being executed in data processor 10 is concerned. When data processor 10 encounters in its program instruction stream a push instruction, which includes the main storage address of the selected location within main storage device 14, data processor 10 writes the desired data element into the data storage location within main storage device 14 and signals to microprocessor 12 to add a data element to serial block storage device 32. Microprocessor 12 records this data element in an empty storage location within the plurality of data storage locations 36 of serial block storage device 32 and advances serial block storage device 32 to the next empty data storage location 36. Should data processor 10 encounter in its instruction stream a pop instruction, containing the address of a data storage location within main storage device 14, data processor 10 signals microprocessor 12 that a stack element from serial block storage device 32 is needed. Mircroprocessor 12 then transfers the appropriate element from data storage location 36 to CPU 50 via data bus 54 which in turn causes storage of the selected element into the selected data storage location within main storage device 14 via data bus 56. Microprocessor 12 then indicates that the selected data storage location 36 is empty and advances serial block storage device 32 one position in the appropriate direction.

Figure 3:
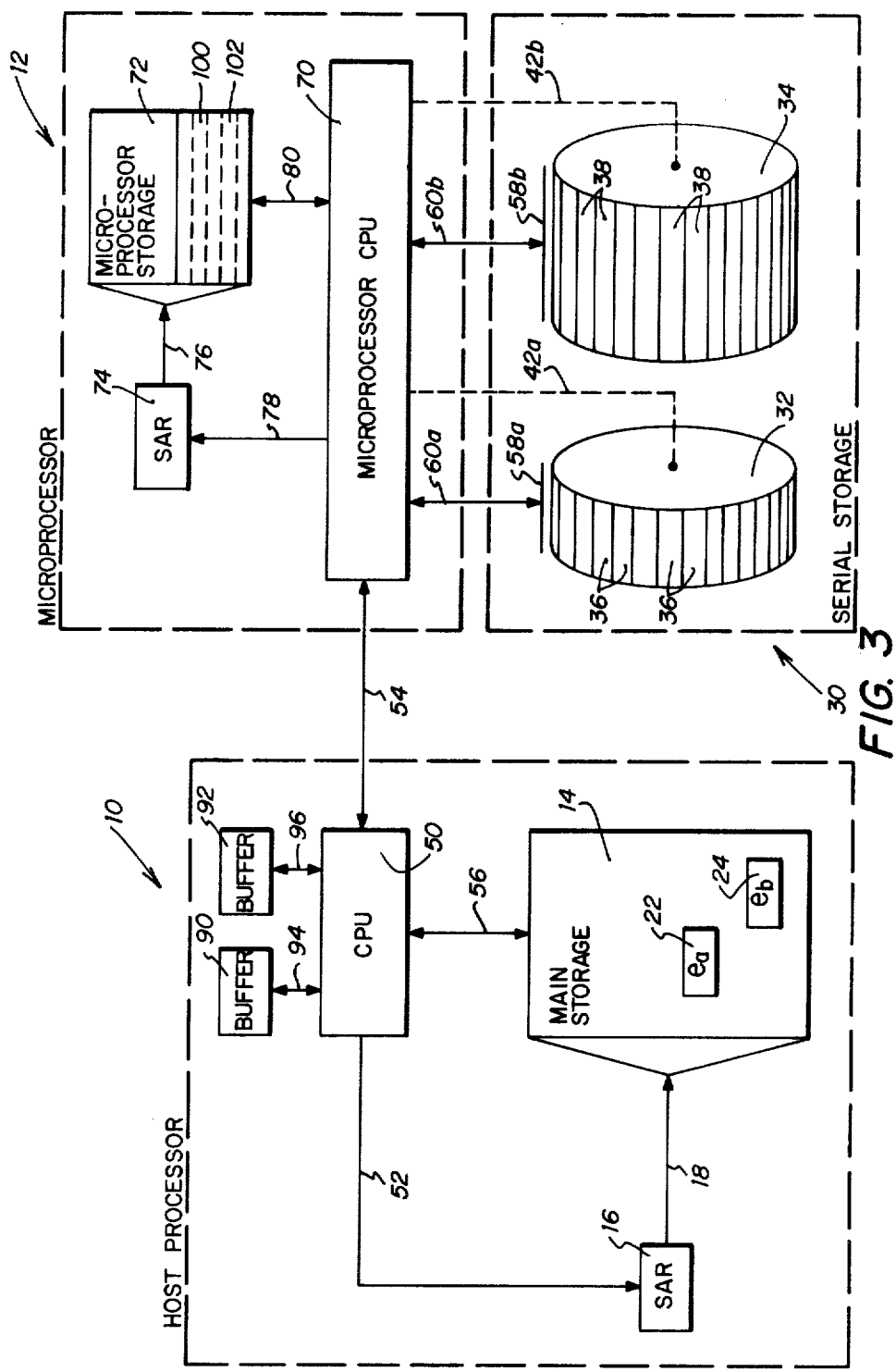
FIG. 3 is a schematic block diagram of a data processing system incorporating the data buffering aspect of the present invention.

Referring now to FIG. 3, wherein like numerals are utilized for like and corresponding components previously identified, a further embodiment of the present invention is illustrated. As is shown in FIG. 1, FIG. 3 illustrates serial block storage devices 32 and 34 each having its own separate access window in main storage device 14 designated as data storage locations 22 and 24. Microprocessor 12 is illustrated as including a microprocessor CPU 70, a microprocessor storage device 72 and a storage address register (SAR) 74 by which microprocessor CPU 70 addresses microprocessor storage device 72. SAR 74 applies an address via signal line 76 to microprocessor storage device 72 and receives address information from microprocessor CPU 70 via signal line 78. Microprocessor storage device 72 and microprocessor CPU 70 communicate via bus 80.

An important aspect of the present invention, as illustrated in FIG. 3, is the use of a data buffering arrangement for use with each serial block storage device 32 and 34. Data buffers 90 and 92 are provided within data processor 10 and communicate with CPU 50 via data buses 94 and 96. Data buffer 90 is used in conjunction with serial block storage device 32, and data buffer 92 is used in conjunction with serial block storage device 34. A stack element data buffer area 100 and a stack element data buffer area 102 are provided within microprocessor storage device 72 and function in conjunction with serial block storage devices 32 and 34. Data buffer 90 is designed to store a single stack element, particularly, a data element and its accompanying index number and can be located in main storage device 14, or as indicated in FIG. 3, can form a discrete hardware register. Data buffer area 100, within microprocessor storage device 72, stores several data elements from serial block storage device 32 and stores both an index number and a data element.

When data elements are being added to data storage locations within serial block storage device 32, each data element progresses from main storage device 14 through an access window such as data storage location 22 to data buffer 90 and then to data buffer area 100 within microprocessor storage device 72. After a predetermined number of data elements have been accumulated in data buffer area 100, they are transferred as a group to serial block storage device 32 wherein each element is placed in a respective data storage location 36 within serial block storage device 32.

In operation, when data elements are being removed from serial block storage device 32, these elements are transferred to data buffer area 100 within microprocessor storage device 72 and via microprocessor CPU 70 are transferred to main storage device 14 and data storage locations, such as data storage location 22. The stored data elements within data buffer area 100 of microprocessor storage device 72 are transferred individually to data buffer 90 for ultimate storage within data storage location 22. After a supply of data elements from data buffer area 100 has been exhausted, another group of data elements and their accompanying index numbers are transferred from serial block storage device 32 to data buffer area 100.

The buffering arrangement of the present invention, previously described, improves the speed at which data elements may be transferred to or from serial block storage device 32 to enable continuous processing of data elements at effective rates approaching that of the data handling rate of data processor 10. In a similar manner, serial block storage device 34 is provided with a data buffer 92 in data processor 10 and a stack element data buffer area 102 is provided within microprocessor storage device 72. This buffer arrangement works in the same manner as does the buffer arrangement previously described relating to serial block storage device 32. Microprocessor 12 operates asynchronously with respect to data processor 10 in order to maintain data buffers 90 and 92 filled and current.

Figure 4:
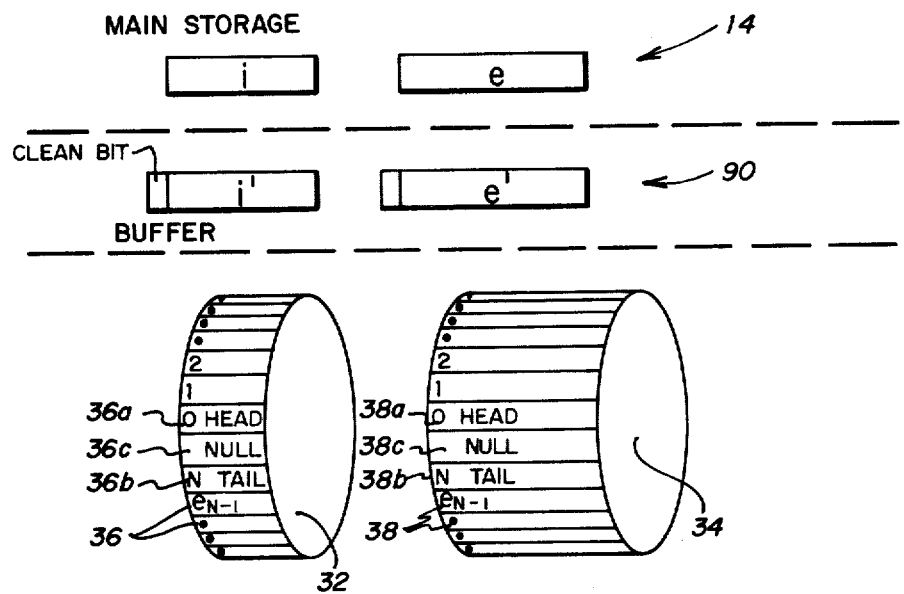
FIG. 4 is a graphical illustration of data storage locations of a block store shown in a ring configuration.

As shown in FIG. 4, each data storage location 36 and 38 is capable of storing a single stack element which includes an index number (i) and a data element field (e). The current element within main storage device 14 is denoted by the letter "e" having an index "i". The "next" element present within a data buffer 90 or data buffer 92 (FIG. 3) is indicated by "e'" having an index "i'". FIG. 4 further illustrates serial block storage devices 32 and 34 as a reel or closed ring having a head, 36a and 38a, and tail 36b and 38b. The index "1" is a circular link for the head of the ring and the highest index number (N) indicates the tail of the ring. A null or empty storage location 36c and 38c is disposed between the head and tail. A clean bit is utilized in the index number field to avoid unnecessary moves of serial block storage devices 32 and 34. The index "0" is a circular link to an index "1" and follows "last in". Index "1" implies "first in". If FIFO access has been declared, the value of i' of data buffer 90 would be (i+1). If LIFO access had been declared, the value of i' would be (i−1). For direct index access, the value of i' would be i. Data buffer 90 is therefore a look-ahead processing element, or a store through cache in direct inquiry to data elements. Serial block storage devices 32 and 34 in effect can rotate as a "wheel" in a "forward", (i+1), direction or a "reverse", (i−1), direction. A buffer management system is described in U.S. Pat. No. 3,588,839 issued to Belady et al on June 28, 1971 and entitled "Hierarchical Memory Updating System".

Figure 5:
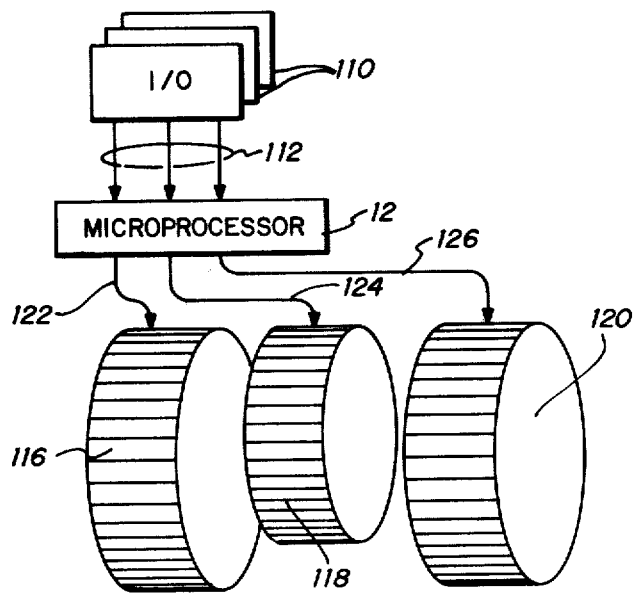
FIG. 5 is a schematic block diagram illustrating the use of the present invention for multiplexing of data from an input/output device.

FIG. 5 illustrates yet another aspect of the present invention wherein a data multiplexing function is performed using the present serial storage subsystem 30. In this aspect of the present invention, there is direct access to serial block storage devices by input/output (I/O) devices. I/O devices 110 apply data elements via signal lines 112 to microprocessor 12. Each data element includes a serial block storage device identification field, a position field and a data field. The identification field indicates which one or more of serial block storage devices, for example, 116, 118 or 120 will receive the data element. Also, the position of the storage location within each serial block storage device 116, 118 or 120 is designated. Microprocessor 12 again performs a controller function and applies data via signal lines 122, 124 and 126 to serial block storage devices 116, 118 and 120. Therefore, all or a selected portion of a data element may be placed in one or any set of serial block storage devices 116, 118, or 120 and within a similar data storage location. Therefore, data may be acquired from I/O devices and used in different sequences and arrangements using the serial storage subsystem of the present invention.

It therefore can be seen that the present invention enables the amount of storage space in a data processor to be increased without increasing the main storage addressing requirements by providing a third dimension to data storage utilizing a serial block storage device. The serial block storage devices utilized with the present invention can be of variable widths and various numbers of serial block storage devices may be utilized depending upon the configuration and architecture of the data processing system.

Whereas the present invention has been described with respect to specific embodiments thereof, it will be understood that various changes and modifications will be suggested to one skilled in the art, and it is intended to encompass such changes and modifications that fall within the scope of the appended claims.

What is claimed is:

1. A data processing system comprising:
   first processor means for generating instructions and push and pop operation codes;
   first data storage means coupled to said first processor means and including a plurality of data storage locations for storing data;
   second processor means coupled to said first processor means;
   second data storage means coupled to said second processor means and including a plurality of data storage locations for storing data, each of said data storage locations of said second data storage means having a larger storage capacity than the storage capacity of each of said data storage locations of said first data storage means;
   control means coupled to said first processor means and to said first data storage means to receive said instructions and codes generated by said first processor means for addressing one of said plurality of data storage locations of said first data storage means as an access window, such that data stored in said addressed one of said plurality of data storage locations of said first data storage means is provided to said first processor means for transfer to said second processor means to permit said second processor means to address said second data storage means, such that said first processor means thereby gains access to at least one of said plurality of data storage locations of said second data storage means by instructing said control means to address one of said plurality of data storage locations of said first data storage means; and
   said second processor means operable in response to said instructions generated by said first processor means for transferring data received from said addressed one of said plurality of data storage locations of said first data storage means between said first processor means and at least one of said plurality of data storage locations of said second data storage means.

2. The data processing system of claim 1 wherein said plurality of data storage locations of said second data storage means are of variable width.

3. The data processing system of claim 1 wherein said control means includes:
   means responsive to said push operation code generated by said first processor means for generating an address of one of said plurality of data storage locations of said first storage means, such that said first processor means transfers data from said addressed one of said plurality of data storage locations of said first storage means to said second processor means for storage within one of said plurality of data storage locations of said second storage means.

4. The data processing system of claim 1 wherein said control means includes:

means responsive to said pop operation code generated by said first processor means for generating an address of one of said plurality of data storage locations of said first storage means, such that said second processor means transfers data from one of said plurality of data storage locations of said second storage means to said first processor means for storage within said addressed one of said plurality of data storage locations of said first storage means.

5. The data processing system of claim 1 wherein said first processor means comprises host processor means and said second processor means comprises microprocessor means.

6. The data processing system of claim 1 wherein said first data storage means comprises random access storage means and said second data storage means comprises serial storage means.

7. The data processing system of claim 6 wherein said serial storage means comprises magnetic bubble storage means.

8. The data processing system of claim 6 wherein said serial storage means comprises charge coupled storage devices.

9. The data processing system of claim 6 wherein said serial storage means comprises electron beam addressable storage means.

10. The data processing system of claim 1 wherein said second data storage means comprises serial block storage means.

11. The data processing system of clam 1 and further including:
buffer means coupled to said second processor means for storing data received by said second processor means from said second data storage means prior to transfer to said first processor means for storage in said first data storage means to thereby increase the speed at which data is transferred to said first processor means from said second processor means.

12. The data processing system of claim 11 wherein said buffer means includes a plurality of buffer means wherein each of said plurality of data storage locations of said second data storage means transfers data to said second processor means for storage in one of said plurality of buffer means.

13. The data processing system of claim 1 and further including:
buffer means coupled to said first processor means for storing data received by said first processor means from said first data storage means prior to transfer to said second processor means for storage in said second data storage means to thereby increase the speed at which data is transferred to said second processor means from said first processor means.

14. The data processing system of claim 13 wherein said buffer means includes a plurality of buffer means wherein each of said plurality of data storage locations of said first data storage means transfers data to said first processor means for storage in one of said plurality of buffer means.

15. The data processing system of claim 1 and further including:
first buffer means coupled to said first processor means for temporarily storing data; and
second buffer means coupled to said second processor means for temporarily storing data, wherein data is transferred between said first and second processor means through said first and second buffer means to thereby increase the speed at which data is transferred between said first and second processor means.

16. The data processing system of claim 1 wherein said second data storage means includes a plurality of second data storage means, such that each one of said plurality of second data storage means transfers data to said second processor means for transfer to said first processor means for storage in a corresponding one of said plurality of data storage locations of said first data storage means.

17. A data processing system comprising:
first processor means for generating instructions and push and pop operation codes;
random access data storage means coupled to said first processor means and including a plurality of data storage locations for storing data;
second processor means coupled to said first processor means;
a plurality of serial block storage means coupled to said second processor means and each including a plurality of data storage locations of variable widths for storing data, each of said data storage locations of said plurality of serial block storage means having a larger storage capacity than the storage capacity of each of said data storage locations of said random access data storage means;
control means coupled to said first processor means and to said random access data storage means to receive said instructions and codes generated by said first processor means for addressing one of said plurality of data storage locations of said random access data storage means as an access window, such that data stored in said addressed one of said plurality of data storage locations of said random access data storage means is provided to said first processor means for transfer to said second processor means to permit said second processor means to address at least one of said plurality of storage locations of a corresponding one of said plurality of serial block storage means;
said second processor means operable in response to said instructions generated by said first processor means for transferring data received from said addressed one of said plurality of data storage locations of said random access data storage means between said first processor means and at least one of said plurality of data storage locations of one of said plurality of serial block storage means;
first buffer means coupled to said first processor means; and
second buffer means coupled to said second processor means, wherein said first and second buffer means temporarily store data prior to data transfer between said first and second processor means.

18. The data processing system of claim 17 wherein said second processor means operates asynchronously to said first processor means.

19. The data processing system of claim 17 wherein said second processor means comprises microprocessor means.

20. The data processing system of claim 17 wherein said control means includes:
means responsive to said push operation code generated by said first processor means for generating an address of one of said plurality of data storage locations of said random access data storage means, such that said first processor means transfers data from said addressed one of said plurality of data storage locations of said random access data storage means to said second processor means for storage within at least one of said plurality of data storage locations of one of said plurality of serial block storage means; and means responsive to said pop operation code generated by said first processor means for generating an address of one of said plurality of data storage locations of said random access data storage means, such that said second processor means transfers data from one of said plurality of data storage locations of one of said plurality of serial block storage means to said first processor means for storage within said addressed one of said plurality of data storage locations of said random access data storage means.

21. The data processing system of claim 20 wherein said serial block storage means comprises magnetic bubble storage means.

22. The data processing system of claim 20 wherein said serial block storage means comprises charge coupled devices.

* * * * *